Nov. 23, 1926.  1,607,766
L. T. McGARVEY
PAN LIFTER
Filed May 27, 1926
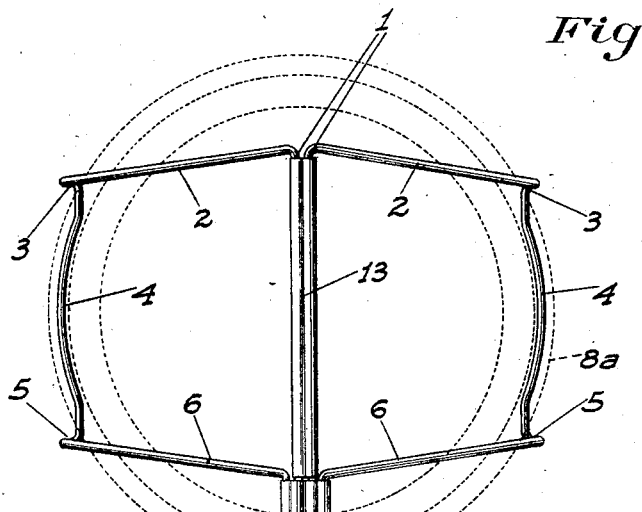
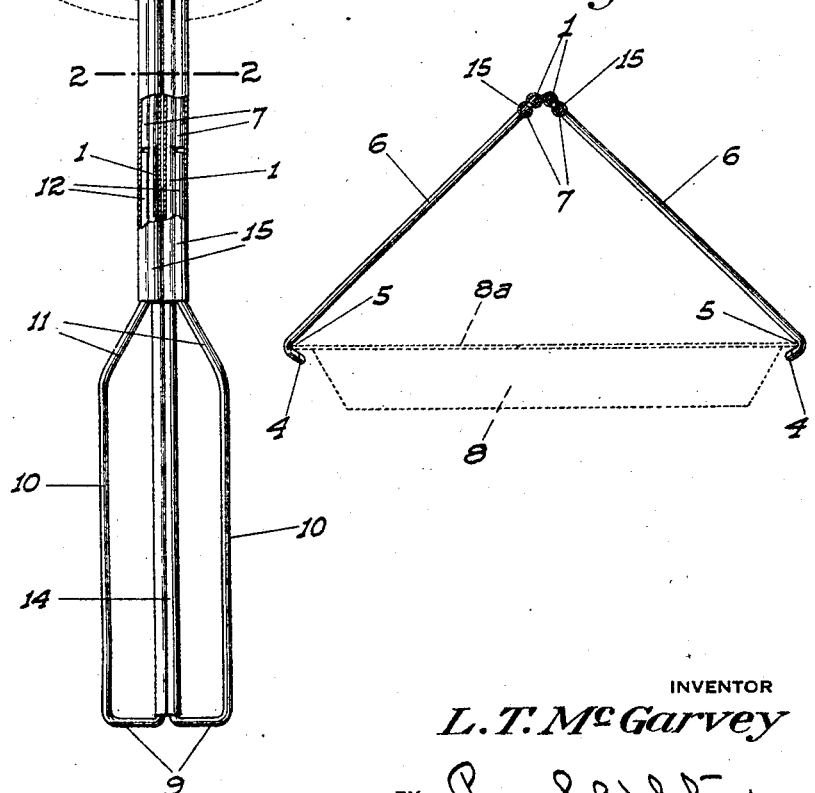
INVENTOR
L. T. McGarvey
BY
ATTORNEY Patented Nov. 23, 1926.

1,607,766

UNITED STATES PATENT OFFICE.

LAURENCE T. McGARVEY, OF STOCKTON, CALIFORNIA.

PAN LIFTER.

Application filed May 27, 1926. Serial No. 111,967.

This invention relates to improvements for lifting pans and other cooking utensils having outwardly projecting rims, whether circular, oval or rectangular, and is especially intended to be used for removing such pans from ovens, when it is almost impossible for the cook to insert his hand into the oven to grasp the pan without getting burnt.

The principal object of my invention is to provide a device for this purpose so constructed that the pan may be grasped, lifted and withdrawn from the oven by the operator without said operator having to insert his hand into the oven, and without danger of the pan slipping off the lifter while the same is being manipulated.

Another object is to provide a device for the purpose so constructed that a single size of the implement may be utilized to engage a pan of practically any standard size without having to first make any adjustments to enable the lifter to fit such size.

I have also constructed the device in such a manner that the gripping of the pan does not depend on spring tension and there is no tendency for the pan when being engaged to slide further into the oven, as is the case with pan lifters having spring pan engaging fingers.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a top plan view of my pan lifter showing a pan engaged thereby.

Fig. 2 is a cross section on the line 2—2 of Fig. 1 looking toward the forward end of the device.

Referring now more particularly to the characters of reference on the drawings, my improved pan lifter comprises a pair of rods or heavy wires 1 of suitable length and of rigid character. These two rods have the pan engaging and handle members formed integral therewith, and since each rod member and its accompanying features is a duplicate of the other, but one of such members will be described.

At one end each rod 1 is bent outwardly for a certain distance to form an arm 2. At the other end of the arm 2 the rod is bent inwardly or toward the rod 1 for a short distance to form a notch or recess as at 3. The rod at the inner end of this recess portion is then bent to extend longitudinally of the rod 1 for a certain distance as at 4, the end of such portion 4 terminating in a notch or recess 5 symmetrical to and the same size as the notch 3. From this notch 5 the rod is then bent to again extend to the rod 1 to form an arm 6 disposed in a plane parallel to the arm 2. At its end adjacent the rod 1 said arm 6 (which is still a portion of the actual rod) is bent to extend alongside the rod 1 for a short distance as at 7 and away from the end of the rod having the arm 2. The portion 4 which connects the arms 2 and 6 preferably has a slight convex curvature relative to the rod 1 so as to substantially conform more or less to the curvature of a pan indicated at 8.

The end of the rod 1 opposite to the arm 2 is bent outwardly for a short distance as at 9 in a plane parallel to the arms 2 and 6; is then bent to extend parallel to the rod 1 and toward the opposite end thereof as at 10; is then further bent to again approach the rod 1 as at 11; and is then still further bent to extend alongside said rod 1 as at 12 in alinement with the portion 7 and terminating short of the adjacent end of the same. The bent portions 9, 10 and 11 form a handle member which is disposed in a plane parallel to the members 2, 4, and 6.

Each rod member has the same handle and pan engaging features which of course normally project away from each other. Between the arms 2 and 6 the rods 1 are surrounded by a pair of rigid and interconnected sleeves 13 in which the said rods are independently turnable. Similarly between the lateral portions 9 and 11 of the handle members, said rods 1 are surrounded by a pair of rigid and interconnected sleeves 14 in which said rods are also independently turnable. Each rod 1 and the adjacent portions 7 and 12 alined therewith are enclosed in a pair of rigid and interconnected sleeves 15, each pair of sleeves being independent of each other and also of the sleeves 13 and 14.

In operation the two handle members are then grasped by one hand of the operator who, by a suitable manipulation of the fingers grasping such handles, can easily cause the same to approach toward or move away from each other, said handles of course turning about the rods 1 as an axis. This turning movement will also impart a similar movement to the pan engaging elements at the opposite ends of the rods, so that the operator from outside the oven may easily move such elements so that they are separated sufficiently for the rim 8ª of the pan to enter the notch portions 3 and 5 of the pan engaging members 4. The handles will then still be at a certain downward angle to each other regardless of the size of the pan and a gripping pressure on the handles, such as is of course necessary when attempting to withdraw the pan from the oven, will automatically cause the pan engaging elements to firmly grip the rim and sides of the pan. When the pan has been withdrawn a slight manipulation of the fingers to cause the handles to be again separated will enable the lifting elements to be at once withdrawn from engagement with the pan.

When not in use the rods 1 may be turned so that the arms 2 of both rods and the parts connected thereto are adjacent each other so that the device then is in a very compact form and occupies but little space. If desired the handles may be turned so that the position of the pan engaging members will be reversed entirely, so that the notches 3 and 5 and the members 4 face away from the rods 1, so that the device may be inserted into any utensil having an overhanging rim. The sleeves 13 and 14 of course serve to connect the two units of the device in a permanent manner, while permitting them to freely turn relative to each other; while the main function of the sleeves 15 is to hide the adjacent ends of the portions 7 and 12, and connect the same to the rods without the necessity of the use of solder or the like.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A pan lifter comprising a pair of parallel and adjacent rods, sleeve means embracing the rods throughout their length to hold the same in adjacent but turnable relationship, pan engaging means projecting laterally from the rods adjacent one end, and handle means projecting laterally from the rods at the other end.

2. A pan lifter comprising a pair of parallel and adjacent rods, individual but connected sleeves in which the rods are turnably mounted, pan engaging means formed with the rods beyond one end of the sleeves, and handles formed with the rods beyond the other end of the sleeves.

3. A pan lifter comprising a pair of parallel and adjacent rods, the rods at one end being bent outwardly for a certain distance, then being bent longitudinally of the main rod portion for a certain distance, said last named bent portions being shaped to engage a pan, the rods at the ends of the pan engaging portion being then further bent to extend to and along the main rods parallel thereto and toward the opposite end thereof, independent sleeve members surrounding each main rod and the adjacent parallel bent portion, connected sleeves independent of the first named sleeve members surrounding the main rods beyond both ends of said first named sleeves, and handle members formed with and projecting laterally from the main rods at the ends thereof opposite to the above named bent portion of the rods.

4. A pan lifter comprising a pair of parallel and adjacent rods, the rods at one end being bent outwardly for a certain distance, then being bent longitudinally of the main rod portion for a certain distance, said last named bent portions being shaped to engage a pan, the rods at the ends of the pan engaging portion being then further bent to extend to and along the main rods parallel thereto and toward the opposite end thereof, independent sleeve members surrounding each main rod and the adjacent parallel bent portion, connected sleeves independent of the first named sleeve members surrounding the main rods beyond both ends of said first named sleeves, the ends of the rods opposite to the first named bends being bent outwardly and parallel to said first bends, for a certain distance; then parallel to said rods toward the other end of the same for a certain distance, then toward and along the main rods; said last named portion of the last named bends projecting into the first named sleeve members.

5. A pan lifter comprising a pair of independent rod members, each member having a longitudinal portion which at one end is bent outwardly to form pan engaging means, and at the other end is bent outwardly to form handle means, and independent pairs of sleeves embracing the longitudinal portions of the rods adjacent the opposite ends thereof; the sleeves of each pair being rigidly connected together and the rods being turnable therein.

In testimony whereof I affix my signature.

LAURENCE T. McGARVEY.